United States Patent
Larkins

(10) Patent No.: US 9,027,126 B2
(45) Date of Patent: May 5, 2015

(54) METHOD AND APPARATUS FOR BAITING PHISHING WEBSITES

(75) Inventor: Joshua Enoch Larkins, Birmingham, AL (US)

(73) Assignee: Bank of America Corporation, Charlotte, NC (US)

( * ) Notice: Subject to any disclaimer, the term of this patent is extended or adjusted under 35 U.S.C. 154(b) by 257 days.

(21) Appl. No.: 13/605,759

(22) Filed: Sep. 6, 2012

(65) Prior Publication Data

US 2014/0041024 A1 Feb. 6, 2014

Related U.S. Application Data

(60) Provisional application No. 61/678,449, filed on Aug. 1, 2012.

(51) Int. Cl.
*H04L 29/06* (2006.01)
*G06F 21/55* (2013.01)

(52) U.S. Cl.
CPC .......... *H04L 63/1483* (2013.01); *G06F 21/554* (2013.01); *H04L 63/1491* (2013.01)

(58) Field of Classification Search
CPC ............................ G06F 21/50; H04L 63/0838
USPC ......................................................... 726/22
See application file for complete search history.

(56) References Cited

U.S. PATENT DOCUMENTS

| | | | |
|---|---|---|---|
| 7,831,522 B1 | 11/2010 | Satish et al. | |
| 8,191,140 B2 | 5/2012 | Cohen et al. | |
| 8,307,433 B2* | 11/2012 | Yue et al. | 726/22 |
| 2005/0086161 A1 | 4/2005 | Gallant | |
| 2009/0228780 A1 | 9/2009 | McGeehan | |
| 2010/0077483 A1 | 3/2010 | Stolfo et al. | |
| 2010/0211996 A1* | 8/2010 | McGeehan et al. | 726/4 |
| 2012/0084866 A1 | 4/2012 | Stolfo | |

FOREIGN PATENT DOCUMENTS

| | | |
|---|---|---|
| EP | 1683293 A1 | 7/2006 |
| EP | 2611106 A1 | 7/2013 |
| WO | 2006092785 A2 | 9/2006 |
| WO | 2007143059 A2 | 12/2007 |
| WO | 2009055785 A2 | 4/2009 |

* cited by examiner

*Primary Examiner* — Longbit Chai
(74) *Attorney, Agent, or Firm* — Banner & Witcoff, Ltd.; Michael A. Springs

(57) ABSTRACT

A cyber fraud phish baiting system for baiting a phishing website is disclosed. The cyber fraud phish baiting system is configured to store a plurality of URLs in a database and enter each of the URLs into a browser to view internet resources linked to the URLs. It is configured to scan the internet resources for information requests, obtain information responsive to the information requests from a database, enter responsive information into the information requests, and store the information requests and the responsive information entered into the information requests for each of the URLs. The internet resource may be a phishing website, and fake information is entered into the information requests.

15 Claims, 2 Drawing Sheets

METHOD AND APPARATUS FOR BAITING PHISHING WEBSITES

FIELD

The invention relates generally to catching individuals who maintain deceptive websites. More specifically, the invention provides a method and apparatus for detecting nefarious activity by automatically providing deceptive websites or phishing websites with false information and tracking the use of the false information to locate the identity of unscrupulous parties.

BACKGROUND

Often unscrupulous parties operate phishing scams to unlawfully take personal information, such as usernames, passwords, addresses, credit card information, and ultimately money by disguising themselves as a trustworthy entity. Unscrupulous parties often lure victims by electronic correspondence seemingly from financial institutions, social websites, auction websites, online payment processors, or IT administrators. Victims may receive emails with links to fake webpages that appear to be authentic. These fake webpages typically request the victim to verify information by entering personal information into various information requests on the website. In this way, the user will believe that a legitimate source requested this information, and the user will enter the requested information onto the fake webpage. The unscrupulous person can then unlawfully take this information and can, for example, access the user's credit card and unlawfully take money from the victim.

For companies that host accounts, such as financial institutions, it is very difficult to determine which users are being targeted by phishing scams and whether unscrupulous parties have taken user information because the victim often gives personal information directly to unscrupulous parties through phishing websites.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In accordance with an exemplary embodiment, one way to catch unscrupulous parties hosting phishing scams is to provide fake information to or to "bait" phishing websites. To bait a phishing website, a company analyst can enter made-up customer information into a phishing website. In this way, the company can track the information to see when and where a unscrupulous person accessed a company website. By submitting a fake set of credentials to a phishing website, the company can track access logs to find the IP address that attempted to log in using the fake credentials. Pivoting on that IP address, it can be assumed that any valid customer logins from the IP address are compromised accounts, and those accounts can be flagged as potentially compromised. Additionally, the unscrupulous person can sometimes be located by tracking this IP address. For example, if the made-up customer's information is used to log onto the company's website, the company can then track down the log-in by tracking the IP address. In this way, compromised accounts can be reviewed to ensure no nefarious activity occurs.

In another exemplary embodiment, an apparatus comprising: a processor; and a memory for storing computer readable instructions for baiting a phishing website is disclosed. The computer readable instructions are configured to be executed by the processor to cause the computer to perform the method steps in the exemplary embodiments described herein.

In another exemplary embodiment, a method comprises receiving and storing a URL, entering the URL into a browser to view an internet resource linked to the URL, searching the internet resource for information requests, obtaining information responsive to the information requests from a database, entering responsive information into the information requests, and storing and displaying the information requests and the responsive information entered into the information requests. A predetermined delay occurs when entering responsive information into the information requests.

In another exemplary embodiment, a method for baiting a phishing website comprises storing a plurality of URLs in a database and entering each of the URLs into a browser to view internet resources linked to the URLs, scanning the internet resources for information requests, obtaining information responsive to the information requests from a database, entering responsive information into the information requests, and storing the information requests and the responsive information entered into the information requests for each of the URLs. The internet resource may be a phishing website, and fake information is entered into the information requests. The information requests may relate to one of the following: username, password, name, full mailing address, phone number, email address and associated password, SSN, credit/debit card number, card expiration, CVV, checking account and routing number, mother's maiden name, father and mother's middle names, and challenge questions designed to authenticate a customer's identity. The type of information requested by the information requests is identified using HTML attributes. After entering the responsive information into the information requests, the system searches for an HTML attribute that identifies submitting the information through the internet resource and submits the information through the internet resource. After submitting the information through the internet resource, the system searches the internet resource for additional information requests and entering responsive information into the information requests from the database.

In another exemplary embodiment, once all of the responsive information is entered into the information requests, the system enters a second URL into the browser to view a second internet resource linked to the second URL, searches the second internet resource for information requests; obtains information responsive to the information requests from a database, enters responsive information into the information requests, and stores and displays the information requests and the responsive information entered into the information requests.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
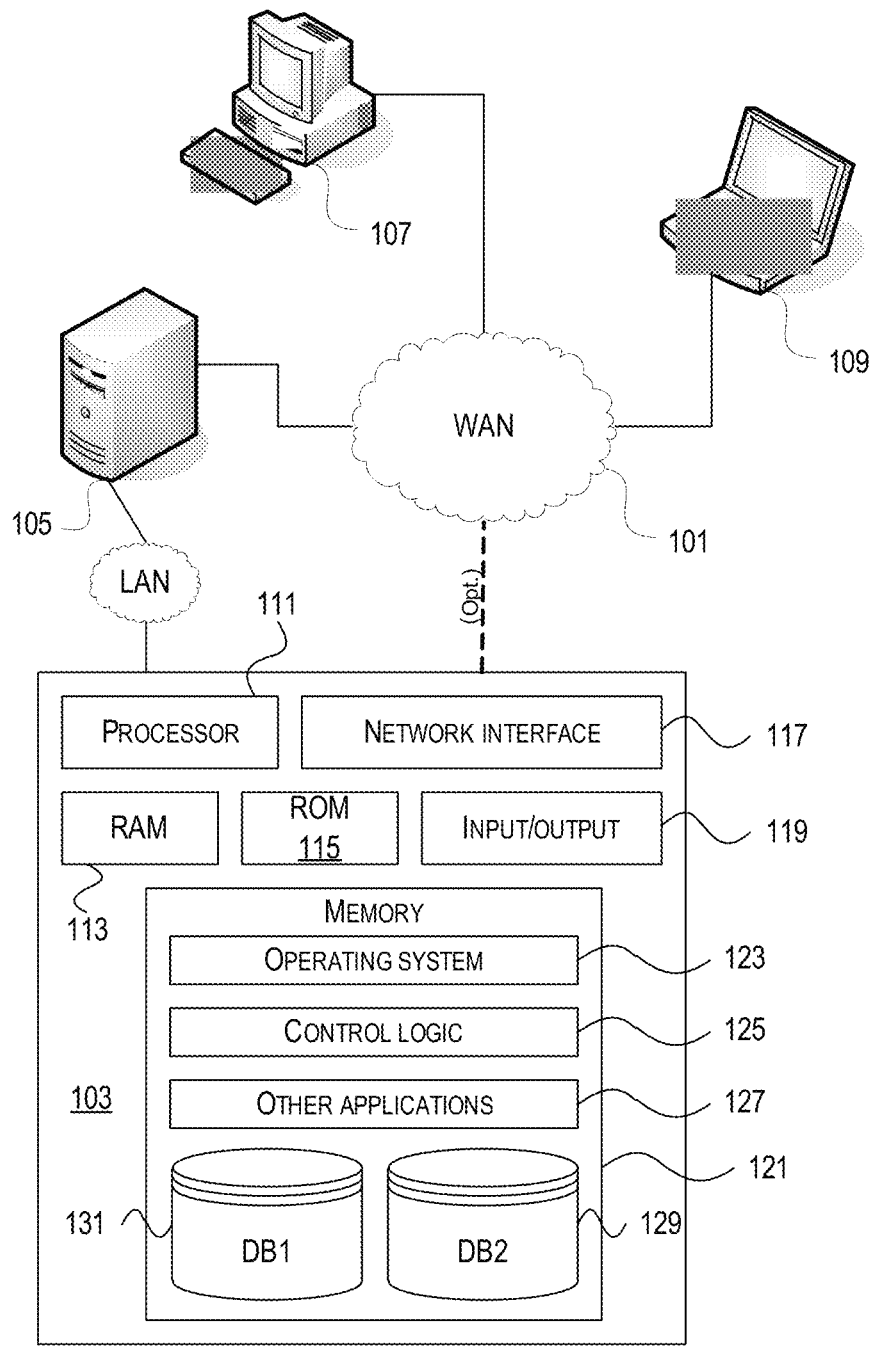
FIG. 1 illustrates one example of a network architecture and data processing device that may be used to implement one or more illustrative aspects of the invention.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed websites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, or printer), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, or data updates).

Memory 121 may also store data used in performance of one or more aspects of the invention, including a first database 129 and a second database 131. In some embodiments, the first database may include the second database (e.g., as a separate table, or report). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS).

One or more aspects of the invention may be embodied in computer-usable or readable data and/or computer-executable instructions, such as in one or more program modules, executed by one or more computers or other devices as described herein. Generally, program modules include routines, programs, objects, components, or data structures. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, or RAM. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

A system and method for automatically providing fake information to or baiting phishing websites will now be described. The system can be referred to as a cyber phish baiting system. The system is configured to enter fake customer information into a phishing website and to track the use of the fake information in order to catch unscrupulous parties operating phishing scams. The system takes a predetermined listing of phishing URLs and baits each URL with fake information. The results of the system are then used to track the fake information by reviewing access logs for a particular website and then to locate unscrupulous parties accessing the website by tracking the IP addresses that access websites using the fake information.

First, a listing of phishing URLs is obtained. These are typically slight variations of a company website, where only a few letters or characters are altered to trick the victim into believing that the website is a legitimate website or legitimate websites that have been compromised and modified to appear as a legitimate company website. Current systems in place are able to locate and generate listings of phishing websites. For example, phishing URLs can be retrieved in real time from a vendor and then can be stored in a database for use by the system in automatically baiting phishing websites.

The listing of the phishing websites can be stored to a database one URL at a time. The URLs are then opened one at a time by the system, and the information requested from the user is automatically populated on the phishing website by the system. For example, the URLs can be retrieved one at a time by the system and then launched in a browser. The system is able to open a browser, launch the phishing website, and populate the requested fields, such as name, street address, or username, passwords with the fake information. The system is able to search each field for HTML attributes or source code attributes for each part of a page to identify the particular field with the particular type of information to be entered, such as name, user name, password, address, phone number. By reviewing the attributes for each field, the system understands which type of data to enter into each field.

In particular, using this method, the system will look at the "type", "name", and "id" attributes of each input element of the webpage and determine what data should be entered into each field on the website. Decisions are made by combining these three attributes and applying them to a cascading set of rules. The first level of determination is made based on the type attribute, which could be, for example, 'text', 'password', 'email', or 'checkbox.' A single rule causes all checkboxes on a website to be selected. For the other three types of input type attribute, 'text', 'password', 'email', rules regarding the name and id attribute values are applied to match those attributes either partially or in whole. The particular matching rule mandates the type of information to be entered into that field. For example, if either the name or id attribute contain the string "pass," that field will be filled with an account password from the database.

A second type of element found on a phishing page is the "select" element. These are drop down boxes used for selecting day/month/year or challenge questions from a prescribed list. Similar rules are applied to choose proper selection.

The system can be further enhanced by incorporating Machine Learning, such that decisions regarding the data entered into a field are based on a database query for the most likely correct response across all previous attempts to answer the same or similar fields. The system will review the website until it has entered data into every field. The system is also configured to search for a "submit" button on the phishing website and to click the submit button. The system will then scan to see if there are additional fields to populate on the next pages, populate those additional fields, and again search for a submit button on those pages until all requested information is filled into the phishing site.

The data entered into each field is either retrieved from a bait identity previously stored in the database, or generated on the fly, depending on what information is needed. If a street address is requested, the street address associated with the bait identity in use will be used. However, if a mother's maiden name is requested, a random name will be selected from a pool of female names. Likewise, if a credit card number is requested, a credit card number will be generated on the fly, sufficient to fool rudimentary algorithms or a Luhn check for detecting invalid card numbers.

Eventually the system will determine that there are no more fields that need to be populated and will determine that it is done filling in the information requested on the phishing website. Typically, phishing websites are configured to direct the user back to the actual company's website to make the phishing website appear to be more legitimate to the user. The system can also detect this to determine that it has filled in all of the information on the phishing website. The system is configured to save each decision along the way that it makes and to save each piece of information that it enters into the phishing website. All of this information can be saved into a centralized database for viewing later and for use in tracking unscrupulous party logins as discussed below.

To counteract any attempts at detecting a system filling out the phishing site, care is taken to cause the system to interact with the phishing website in the same manner a human would. Pauses of 5 to 20 seconds are observed on each page to emulate the way a human would read the content of a web page. Countermeasures are also taken when entering text into each field, such that each character is entered at a random speed between 75 and 225 milliseconds, to emulate human typing speed.

The fake information that was entered into the system by the baiting program is tracked by determining when the fake information is used to login to websites. The login can then be tracked to determine where and when the information was entered into the website. In this way, other logins from that same location to valid customer accounts can also be tracked and it can be determined that these valid accounts are now compromised.

Figure 2:
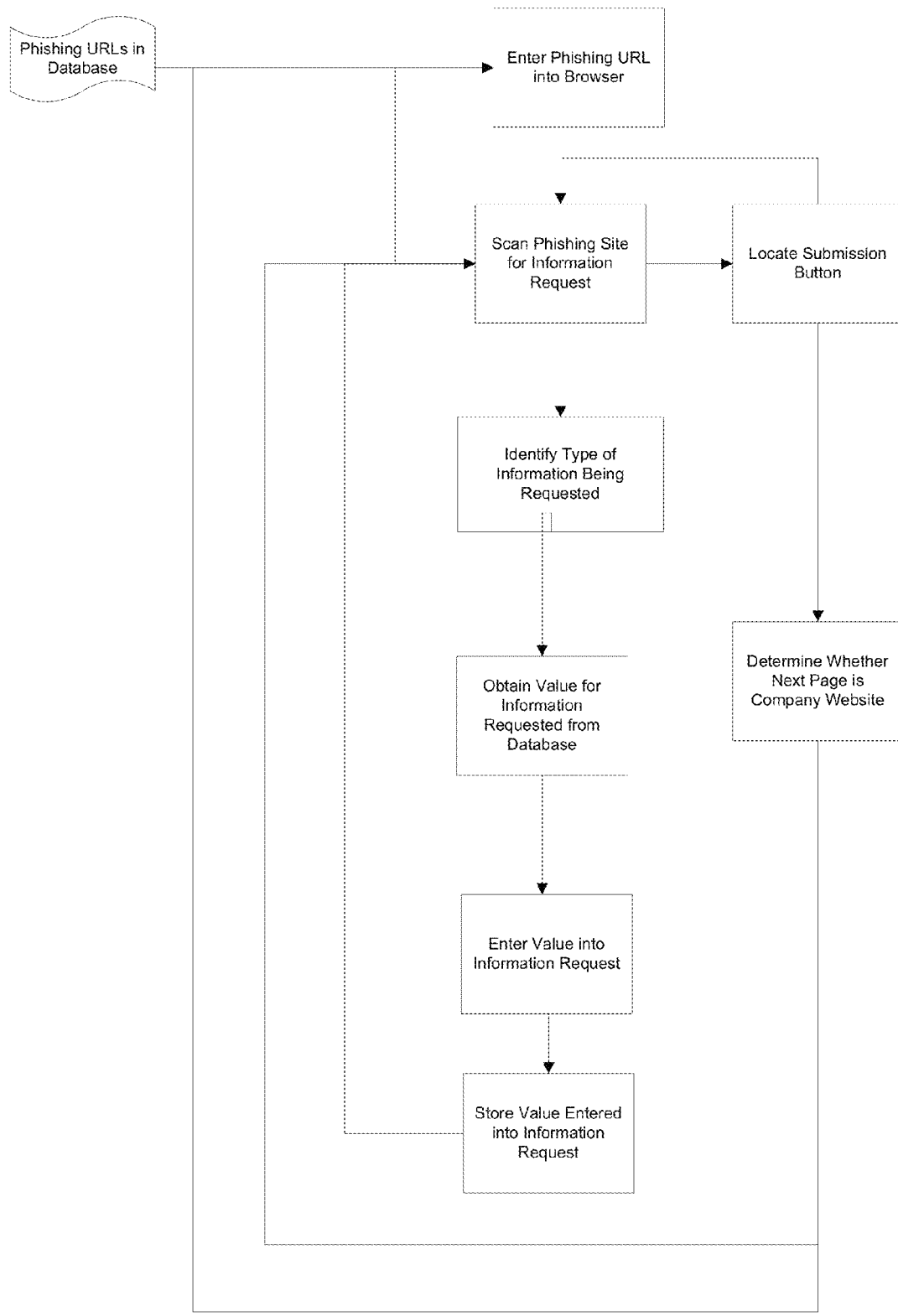
FIG. 2 illustrates a flow diagram for an exemplary process disclosed herein.

FIG. 2 depicts an exemplary process for automatically baiting phishing websites. First, a series of phishing URLs are received and stored into a database. Next, the system takes the first URL in the database and enters the URL into a browser to view the phishing website linked to the URL. The phishing website is then scanned for information requests. A particular information request is identified according to the type of information requested, and the system obtains the type of information identified from a database. The information from the database is then entered into the information request. This continues until all of the information is entered into the first page of the phishing website. The system then locates the submission button and advances to the next page. The system then scans the next page and runs the process over again until all of the information is filled into the next page. This process continues until all information is filled into all pages of the phishing website or until the phishing website redirects the system to a legitimate company website. The system stores the particular information requests and the responsive information that was entered into each information request. The system then continues with each URL that is stored in the database.

The system can be configured such that multiple programs can be run simultaneously. In this way multiple applications can be run and connected to the same central database. With multiple programs operating, each would be entering information into various phishing websites simultaneously. Thus, for n multiples, the work would be completed n times faster.

By developing an automated system for baiting phishing websites and storing the actions of the automatic baiting system, the exact types of data can be retrieved such as the data requested by each phishing website, the precise pieces of data submitted by the system, the order that the data was requested, and the exact time of day that the phishing website was baited. Also, metrics, such as how soon before a phishing site is removed from the internet should a site be baited to be effective, how effective is baiting as soon as the site is detected versus waiting before baiting the website, could be compiled if baiting was done using an exacting process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus comprising:
   A hardware processor; and
   a memory for storing computer readable instructions that, when executed by the processor, cause the computer to perform a method of automatically baiting phishing websites comprising:
   receiving by the processor and storing a predetermined target URL of a phishing website;
   automatically entering by the processor the predetermined target URL of the phishing website into a browser to view an internet resource linked to the predetermined target URL;
   automatically searching by the processor the internet resource for information requests;
   automatically obtaining by the processor fake information responsive to the information requests from a database;
   entering by the processor the fake information responsive to the information requests into the information requests, wherein a predetermined delay occurs while entering information within each information request to emulate a human entry;
   submitting the fake information responsive to the information requests through the internet resource;
   searching by the processor the internet resource for additional information requests after submitting the fake information through the internet resource, wherein the additional information includes, at least, a challenge question designated to authenticate a client's identity;
   entering responsive information into the additional information requests from the database; and
   storing and maintaining the information requests displayed by the internet resource and the responsive information entered into the information requests for future access by a user so as to track a usage of the fake information to locate an identity of a malicious user.

2. The apparatus of claim 1, wherein a plurality of predetermined target URLs are stored and each of the predetermined target URLs are entered into a browser to view internet resources linked to the URLs;
   scanning the internet resources for information requests;
   obtaining information responsive to the information requests from a database;
   entering responsive information into the information requests; and
   storing the information requests and the responsive information entered into the information requests for each of the URLs.

3. The apparatus of claim 1 wherein the information requests relate to one of the following: username, password, name, full mailing address, phone number, email address and associated password, SSN, credit/debit card number, card expiration, CVV, checking account and routing number, mother's maiden name, father and mother's middle names, and challenge questions designed to authenticate a customer's identity.

4. The apparatus of claim 1, wherein the type of information requested by the information requests is identified using HTML attributes.

5. The apparatus of claim 1, wherein after entering the responsive information into the information requests, searching for an HTML attribute that identifies submitting the information through the internet resource and submitting the information through the internet resource.

6. The apparatus of claim 1 wherein after submitting the information through the internet resource, detecting that the browser has been directed to a non-predetermined URL.

7. A method comprising:
   receiving by a hardware processor and storing a predetermined target URL of a phishing website;
   automatically entering by the hardware processor the predetermined target URL of a phishing website into a browser to view an internet resource linked to the predetermined target URL;
   automatically searching by the hardware processor the internet resource for information requests;
   automatically obtaining by the hardware processor fake information responsive to the information requests from a database;
   entering by the hardware processor the fake information responsive to the information requests into the information requests, where a predetermined delay occurs while entering information within each information request to emulate a human entry;
   submitting the fake information responsive to the information requests through the internet resource;
   searching by the processor the internet resource for additional information requests after submitting the fake information through the internet resource, wherein the additional information includes, at least, a challenge question designated to authenticate a client's identity;
   entering responsive information into the additional information requests from the database; and
   storing and maintaining the information requests displayed by the internet resource and the responsive information entered into the information requests for future access by a user so as to track a usage of the fake information to locate an identity of a malicious user.

8. The method of claim 7, wherein a plurality of predetermined target URLs are stored and each of the predetermined target URLs are entered into a browser to view internet resources linked to the predetermined target URLs;

scanning the internet resources for information requests;
obtaining information responsive to the information requests from a database;
entering responsive information into the information requests; and storing the information requests and the responsive information entered into the information requests for each of the predetermined target URLs.

9. The method of claim 7 wherein the internet resource is a phishing website.

10. The method of claim 7 wherein the information requests relate to one of the following: username, password, name, full mailing address, phone number, email address and associated password, SSN, credit/debit card number, card expiration, CVV, checking account and routing number, mother's maiden name, father and mother's middle names, and challenge questions designed to authenticate a customer's identity.

11. The method of claim 7, wherein the type of information requested by the information requests is identified using HTML attributes.

12. The method of claim 7, wherein after entering the responsive information into the information requests, searching for an HTML attribute that identifies submitting the information through the internet resource and submitting the information through the internet resource.

13. The method of claim 12 wherein after submitting the information through the internet resource, searching the internet resource for additional information requests and entering responsive information into the information requests from the database.

14. The method of claim 1, wherein an additional predetermined delay comprises an initial delay on each page to emulate a way a human would read content of a web page before any responsive information is entered, and a typing delay where each character is entered at a random speed to emulate human typing speed.

15. The method of claim 7, wherein an additional predetermined delay comprises an initial delay on each page to emulate a way a human would read content of a web page before any responsive information is entered, and a typing delay where each character is entered at a random speed to emulate human typing speed.

* * * * *